United States Patent
Campbell et al.

(10) Patent No.: US 10,476,548 B2
(45) Date of Patent: Nov. 12, 2019

(54) ELECTRICALLY ISOLATED PUSH-TO-TALK DEVICES

(71) Applicant: Black Diamond Advanced Technology, LLC., Chandler, AZ (US)

(72) Inventors: Ramon Campbell, Chandler, AZ (US); Colin Oetken, Gilbert, AZ (US)

(73) Assignee: BLACK DIAMOND ADVANCED TECHNOLOGY, LLC, Chandler, AZ (US)

( * ) Notice: Subject to any disclaimer, the term of this patent is extended or adjusted under 35 U.S.C. 154(b) by 0 days.

(21) Appl. No.: 15/467,511

(22) Filed: Mar. 23, 2017

(65) Prior Publication Data

US 2017/0279484 A1    Sep. 28, 2017

Related U.S. Application Data

(60) Provisional application No. 62/312,811, filed on Mar. 24, 2016.

(51) Int. Cl.
*H04B 1/48* (2006.01)
*H04W 4/10* (2009.01)

(52) U.S. Cl.
CPC .............. *H04B 1/48* (2013.01); *H04W 4/10* (2013.01); *H04B 2001/485* (2013.01)

(58) Field of Classification Search
CPC .... H04M 1/6058; H04M 1/05; H04M 1/6066; H04M 1/72527; H04M 1/0258; H04M 1/271; H04M 1/57; H04M 1/6041; H04M 1/6075; H04M 1/6083; H04M 1/6091; H04M 1/72547; H04M 2250/08; H04M 9/082; H04B 1/385; H04B 2001/3866; H04B 1/3877; H04B 1/44; H04B 1/3827; H04B 5/06; H04B 1/034; H04B 1/082; H04B 1/088; H04B 1/18; H04B 1/406; H04B 1/46; H04B 1/525; H04B 2001/3855; H04B 7/26; H04R 2201/107;
(Continued)

(56) References Cited

U.S. PATENT DOCUMENTS

2003/0092399 A1 * 5/2003 Davies ................ H04B 1/3827
                                                    455/88
2005/0079885 A1 * 4/2005 Patino ...................... H04M 1/05
                                                    455/518
(Continued)

*Primary Examiner* — Golam Sorowar
(74) *Attorney, Agent, or Firm* — Parson Behle & Latimer

(57) ABSTRACT

Communications systems containing an electrically-isolated Push-To-Talk (EI-PTT) device are described in this application. The communication systems contain multiple radios, a microphone/headset, and a centralized power supply. The systems also contain an EI-PTT device which reduces or eliminates noise that can disrupt the audio transmission. The EI-PTT device allows an operator or user of the communication system to actuate a button which remotely switches the radio from receive mode to transmit mode. This allows multiple users to listen (receive) to communication traffic on the same frequency at all times, but only speak (transmit) on the frequency while activating the EI-PTT device. Unlike other PTT devices which electrically tie the ground signals inside the device, the EI-PTT devices electrically isolate the ground signals to reduce the problem of noise coupling. Other embodiments are described.

19 Claims, 5 Drawing Sheets

(58) Field of Classification Search
CPC .............. H04R 2499/11; H04R 1/1041; H04R 2420/09; H04R 5/04; H04R 2420/05; H04R 5/033; H04R 1/083; H04R 1/1033; H04R 3/00
See application file for complete search history.

(56) References Cited

U.S. PATENT DOCUMENTS

| | | | |
|---|---|---|---|
| 2008/0085679 A1* | 4/2008 | Fettig | H04B 1/3877 455/41.2 |
| 2015/0104034 A1* | 4/2015 | Jennings | H04R 3/00 381/74 |
| 2015/0244406 A1* | 8/2015 | Abdullah | H04B 1/385 455/90.2 |
| 2017/0012663 A1* | 1/2017 | Tamer | H04B 1/525 |

* cited by examiner

ELECTRICALLY ISOLATED PUSH-TO-TALK DEVICES

FIELD

This application relates generally to communication devices and systems. More specifically, this application relates to communications systems containing an electrically-isolated Push-To-Talk (EI-PTT) device.

BACKGROUND

Radio transmission and reception is the technology of using radio waves to carry information, such as sound, by systematically modulating properties of electromagnetic energy waves transmitted through space, such as their amplitude, frequency, phase, or pulse width. When radio waves strike an electrical conductor, the oscillating fields induce an alternating current in the conductor. The information in the waves can be extracted and transformed back into its original form.

Radio systems need a transmitter to modulate (change) some property of the energy produced to impress a signal on it, for example using amplitude modulation or angle modulation (which can be frequency modulation or phase modulation). Radio systems also need an antenna to convert electric currents into radio waves, and vice versa. An antenna can be used for both transmitting and receiving. The electrical resonance of tuned circuits in radios allows individual stations to be selected or certain frequencies (channels) to be monitored. The electromagnetic wave is intercepted by a tuned receiving antenna. A radio receiver receives its input from an antenna and converts it into a form that is usable for the consumer, such as sound, pictures, digital data, measurement values, navigational positions, etc. Radio frequencies occupy the frequency range from 3 kHz to 300 GHz, although commercially important uses of radio use only a small part of this spectrum.

A radio communication system sends signals by radio. The radio equipment involved in communication systems includes a transmitter and a receiver, each having an antenna and appropriate terminal equipment such as a microphone at the transmitter and a speaker at the receiver, in the case of a voice-communication system.

Some communication systems contain two radios that are connected to a central headset/microphone and are powered by a centralized power supply and a communication controller (used to control the system) and typically configured as a closed-loop system. These systems generally contain Push-To-Talk (PTT) devices which can introduce communication noise generated by the configuration of the system and the circuitry in the devices.

SUMMARY

This application relates generally to communications systems containing an electrically-isolated Push-To-Talk (EI-PTT) device. The communication systems contain multiple radios, a microphone/headset, and a centralized power supply. The systems also contain an EI-PTT device which reduces or eliminates noise that can disrupt the audio transmission. The EI-PTT device allows an operator or user of the communication system to actuate a button which remotely switches the radio from receive mode to transmit mode. This allows multiple users to listen (receive) to communication traffic on the same frequency at all times, but only speak (transmit) on the frequency while activating the EI-PTT device. Unlike other PTT devices which electrically tie the ground signals inside the device, the EI-PTT devices electrically isolate the ground signals to reduce the problem of noise coupling.

BRIEF DESCRIPTION OF THE DRAWINGS

The following description can be better understood in light of Figures herein which show various embodiments and configurations of the communication systems. Together with the following description, the Figures demonstrate and explain the principles of the structures, methods, and principles described herein. In the drawings, the thickness and size of components may be exaggerated or otherwise modified for clarity. The same reference numerals in different drawings represent the same element, and thus their descriptions will not be repeated.

In addition, as the terms on, disposed on, attached to, connected to, or coupled to, etc. are used herein, one object (e.g., a material, element, structure, member, etc.) can be on, disposed on, attached to, connected to, or coupled to another object—regardless of whether the one object is directly on, attached, connected, or coupled to the other object or whether there are one or more intervening objects between the one object and the other object. Also, directions (e.g., on top of, below, above, top, bottom, side, up, down, under, over, upper, lower, lateral, orbital, horizontal, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

DETAILED DESCRIPTION

The following description supplies specific details in order to provide a thorough understanding. Nevertheless, the skilled artisan will understand that the described devices can be implemented and used without employing these specific details. Indeed, the described devices and methods can be placed into practice by modifying the described systems and methods and can be used in conjunction with any other apparatus and techniques conventionally used in the industry.

Figure 1:
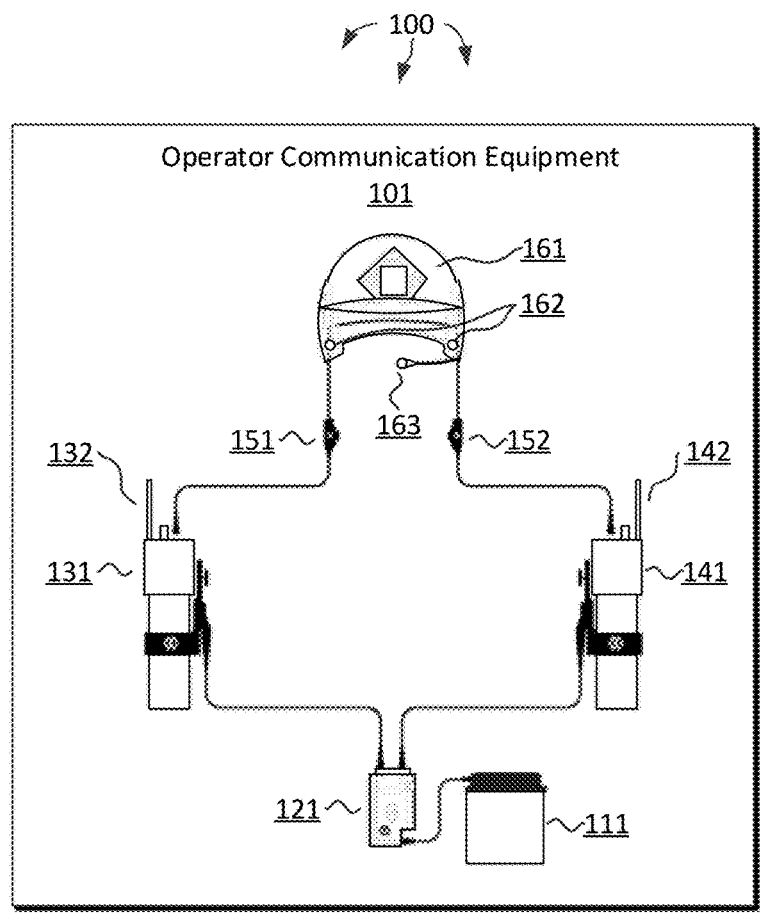
FIG. 1 illustrates some embodiments of a communication configuration of a mobile operator.

FIG. 1 illustrates an example of a communication system configuration 100. Communication configuration 100 can be used to perform various communication functions or procedures. Communication configuration 100 includes operator communication equipment 101. The communication configuration 100 can be portable or fixed, associated with a stationary operator or a mobile operator, and/or outfitted in a vehicle or in a command center.

As shown in FIG. 1, the operator communication equipment 101 includes centralized power source 111, power management controller 121, radio 131 and radio 141 which are powered via the power management controller 121, push-to-talk (PTT) device 151, PTT device 152, and headset 161 (which includes speakers 162 and microphone 163). The centralized power source 111 with external connections. In some embodiments, the centralized power source 111 can supply power to two or more radios. Examples of centralized power source 111 can include primary batteries, such as single-use or "disposable" batteries, and/or secondary (rechargeable) batteries such as lead-acid batteries (such as those typically used in vehicles), lithium-ion batteries (such as those typically used for portable electronics such as laptops, smartphones, or portable power tools), nickel cadmium (NiCd) batteries, nickel-metal hydride (NiMH) batteries, lithium polymer batteries, and the like.

The power management controller 121 includes any type of device capable of supplying electric energy to an electrical load. One function of the power management controller is to convert one form of electrical energy to another and regulate the power distribution. The power management controller can be a discrete, stand-alone device or built into larger devices along. The power management controller can obtain energy from various types of energy sources, including electrical energy transmission systems, energy storage devices such as batteries and fuel cells, electromechanical systems such as generators and alternators, solar power converters, another power management controller, and the like. The power management controller takes this power input from the energy source, and delivers that energy to the load. The power management controller therefore contains a power input and power output containing electrical connectors or hardwired circuit connections, and may contain other inputs and outputs as well, for functions such as external monitoring and control. In some embodiments, the power management controller 121 receives power from centralized power source 111 and regulates the distribution of power to radio 131 and radio 141.

The radio 131 and radio 141 includes any type of device capable of transmitting radio signals and/or receiving radio signals. Radio 131 and radio 141 can make use of antenna 132 and antenna 142, respectively. In some configurations, the communication system contains a two-way radio (transceiver) that allows the operator to have a conversation with other similar radios operating on the same radio frequency (channel). A transceiver typically combines and shares common transmitting and receiving circuitry in a single housing. Transceiver radios are available in mobile, stationary base and hand-held portable configurations.

In some embodiments, radio 131 and radio 141 interface with power management controller 121 and with headset 161. Radio 131 and radio 141 receive power from centralized power source 111 via power management controller 121. Radio 131 and radio 141 electrically interface with headset 161. Received radio signals by radio 131 and/or radio 141 are transformed to audible messages at speaker(s) 162. The operator's audible message into microphone 163 can be transformed to an electrical signal and transmitted via antenna 132 of radio 131 and/or via antenna 142 of radio 141.

The PTT device 151 and PTT device 152 include any type of device capable of manually or remotely activating the transmit function on a transmitting radio when actuated. In some embodiments, a button can be actuated (i.e., depressed) to activate the transmit function/Two-way radio systems usually operate in a half-duplex mode; that is, the operator can talk, or he can listen, but not at the same time. A push-to-talk or press-to-transmit button activates the transmitter; when it is released the receiver is active.

In some embodiments, PTT device 151 and PTT device 152 provides an electrical connection between radio 131 and microphone 163 and radio 141 and microphone 163, respectively. When the button on PTT device 151 is depressed, the transmit function of radio 131 is activated. When the button on PTT device 151 is released, radio 131 is in receive mode. When the button on PTT device 152 is depressed, the transmit function of radio 141 is activated. When button on PTT device 152 is released, radio 141 is in receive mode.

The headset 161 includes any type equipment capable of being worn or utilized by an operator to house speakers 162 and microphone 163. A headset combines a headphone with a microphone. Headsets are made with either a single-earpiece (mono) or a double-earpiece (mono to both ears or stereo). Headsets can provide the equivalent functionality of a telephone handset but with hands-free operation. The microphone arm of the headset can carry an external microphone or be of the voicetube type. In some embodiments, a microphone 163 within headset 161 can be electrically connected to radio 131 and radio 141 via PTT device 151 and PTT device 152, respectively. When the button on PTT device 151 is pressed, the transmit mode on radio 131 is activated, and any audible communication into microphone 163 is transmitted via radio 131. When the button on PTT device 151 is released, the receiver on radio 131 is made active. When the button on PTT device 152 is pressed, the transmit mode on radio 141 is activated, and any audible communication into microphone 163 is transmitted via radio 141. When the button on PTT device 152 is released, the receiver on radio 141 is made active.

Figure 2:
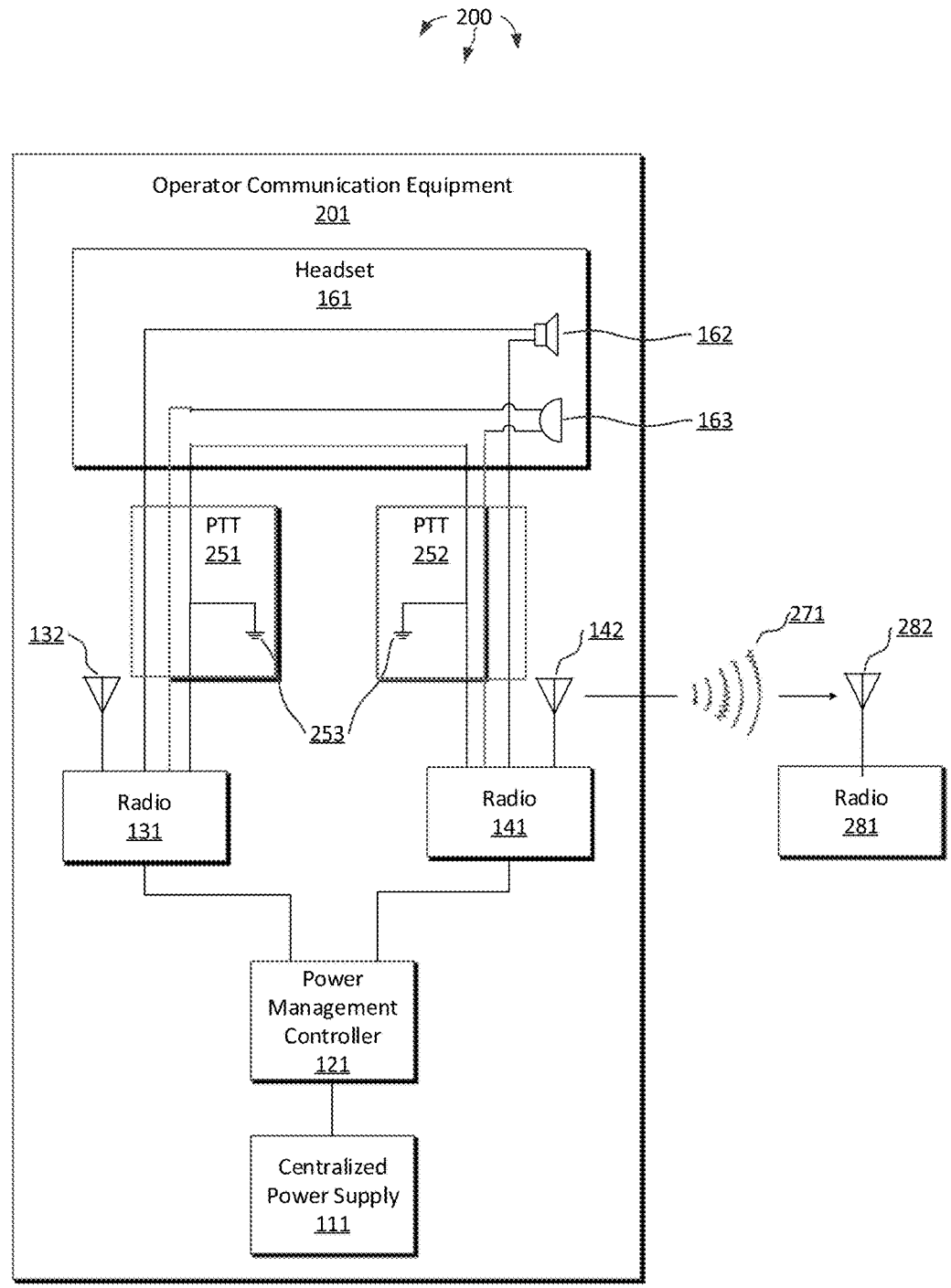
FIG. 2 illustrates a communication configuration that utilizes Push-To-Talk (PTT) devices which electrically tie the ground signal between the radio and the headset/microphone.

FIG. 2 illustrates a communication system configuration 200 that facilitates the ability of an operator to utilize wearable communication systems to communicate with other radio users. In this configuration, the PTT devices electrically tie the ground signal between the radio and the headset (microphone) which induces a noise issue into the system. Communication configuration 200 can be associated with a stationary operator or a mobile operator, and/or outfitted in a vehicle or in a command center.

As shown in FIG. 2, the communication system configuration 200 includes operator communication equipment 201 and radio 281. The operator communication equipment 201 includes centralized power supply 111, power management controller 121, radio 131 and radio 141, PTT device 251 and PTT device 252, and headset 161, as described herein. The centralized power supply 111 is configured to store and supply power to power management controller 121. For example, centralized power supply 111 can be a battery pack of primary batteries, such as single-use or "disposable" batteries, and/or secondary (rechargeable) batteries, such as lead-acid batteries, lithium-ion batteries, nickel cadmium batteries, nickel-metal hydride batteries, and/or lithium polymer batteries, and the like. The power management controller 121 is configured to receive power from centralized power supply 111 and manage and distribute power to radio 131 and radio 141.

In general, radio 131 and radio 141 are configured to transmit radio signals and receive radio signals utilizing antenna 132 and 142 respectively. Radio 131 and radio 141 can interface with power management controller 121, headset 161, and PTT devices 251 and 252, respectively. For example, radio 131 and radio 141 can be mobile, stationary base, and/or hand-held portable radios, such as walkie-talkies, and the like. Radio 131 and radio 141 can transmit radio signals when in transmit mode and can receive radio signals when in receive mode. In some embodiments, radio 131 can be utilized to communicate with an operator's control center and radio 141 can be utilized to communicate with an operator's team, or vice versa.

PTT device 251 and PTT device 252 are configured to interface with radio 131 and radio 141 respectively and microphone 163 on headset 161. PTT device 251 and PTT device 252 are configured to allow an operator to depress a button which remotely activates the radio transmit function on radio 131 and radio 141, respectively.

In communication configuration 200, multiple ground paths are introduced which allows noise to couple onto the microphone circuit of headset 161. PTT device 251 and PTT device 252 are configured to electrically tie ground signals 253 of operator communication equipment 201 within PTT device 251 and/or 252 when depressed. The noise introduced varies in frequency and magnitude based on the type of transmission, but in most cases renders the transmission undecipherable as depicted by noisy radio signal 271 being transmitted from antenna 142 of radio 141 to antenna 282 of radio 281.

As depicted, headset 161 includes speaker 162 and microphone 163. Headset 161 is configured to be worn by an operator to house speakers 162 and microphone 163. Headset 161 is configured to electrically interface with radio 131 and radio 141. For example, speakers 162 are configured to convert radio signals received by radio 131 and radio 141 into audible signals that the operator can hear. Additionally, microphone 163 within headset 161 is configured to electrically interface with radio 131 via PTT device 251 and with radio 141 via PTT device 252. When the button on PTT device 251 is pressed, the transmit mode on radio 131 is activated, and any audible communication into microphone 163 is transmitted via radio 131. When the button on PTT device 251 is released, the receiver on radio 131 is made active. When the button on PTT device 252 is pressed, the transmit mode on radio 141 is activated, and any audible communication into microphone 163 is transmitted via radio 141. When the button on PTT device 252 is released, the receiver on radio 141 is made active. When PTT devices 251 and 252 are not pressed, any received transmissions from radio 131 and/or radio 141 are converted into audible signals at speaker 162 for the operator to hear. Speaker 162 of headset 161 can be a single-earpiece design or a double-earpiece design, and the like. Microphone 163 of headset 161 can be an external microphone or of the voicetube type, and the like.

As depicted in FIG. 2, the communication configuration 200 includes radio 281. Radio 281 is configured to receive and transmit radio signals via antenna 282. For example, radio 281 can receive transmission 271 from antenna 142 of radio 141. As discussed previously, because of the design of PTT device 252, when the button of PTT device 252 is depressed, ground signals 253 of operator communication equipment 201 are tied within PTT device 252, resulting in a noisy, undecipherable transmission 271 emanating from radio 141.

Figure 3:
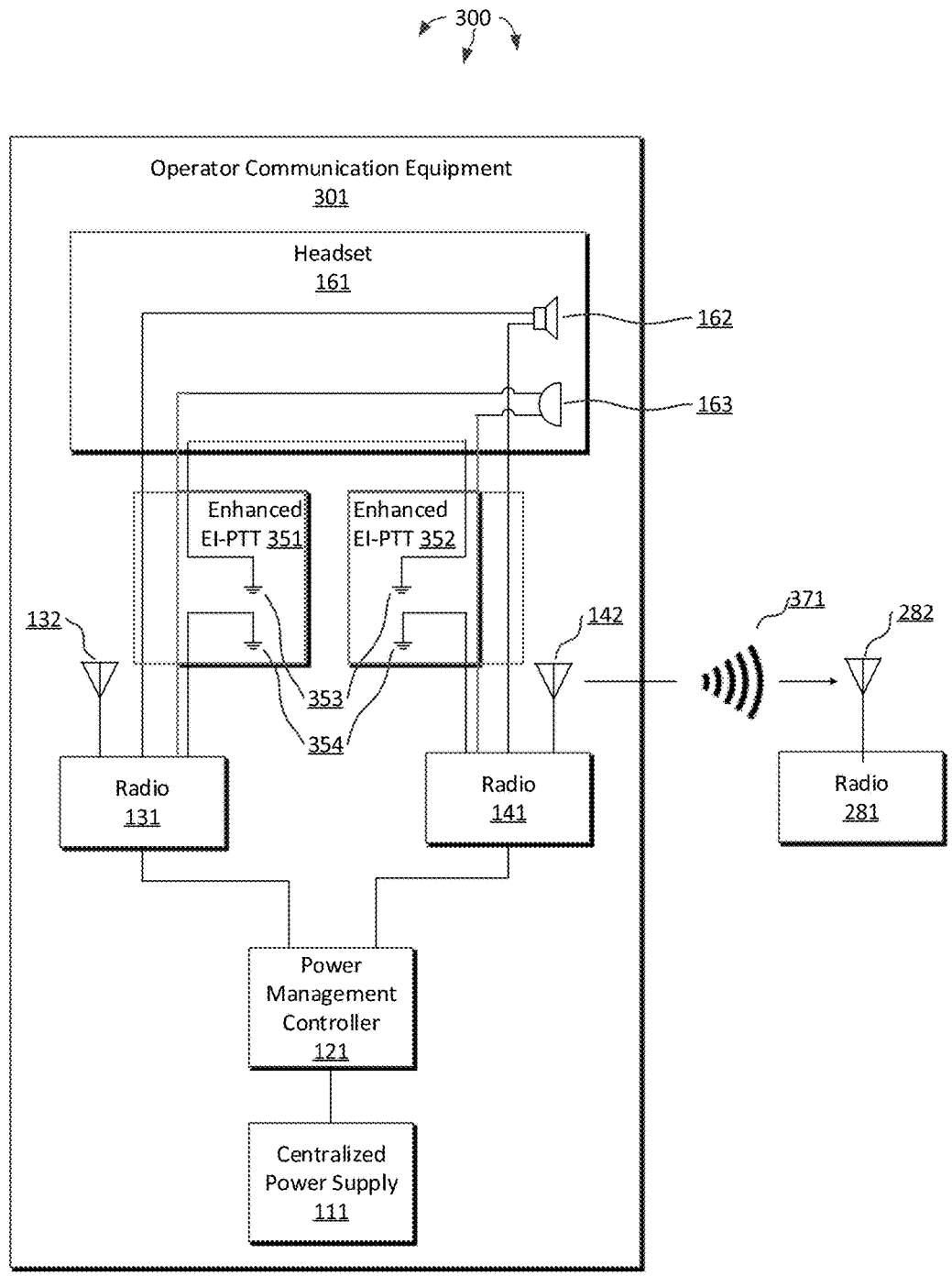
FIG. 3 illustrates some embodiments of a communication configuration that utilizes electrically-Isolated (EI) PTT devices to electrically isolate all of the signals through the PTT device and reduce/eliminate unintended noise during transmission.

FIG. 3 illustrates a communication system configuration 300. These embodiments are similar to communication configuration 200, with the exception that they contain EI-PTT devices 351 and 352, electrically isolated ground signals 353 and 354, and clean transmission signal 371. Like communication configuration 200, communication configuration 300 can be associated with a stationary operator or a mobile operator, and/or outfitted in a vehicle or in a command center.

As shown in FIG. 3, communication configuration 300 includes operator communication equipment 301 and radio 281. In these embodiments, multiple ground paths are used which allows noise to couple onto the microphone circuit of headset 161. In closed-loop communications systems, the noise introduced varies in frequency and magnitude based on the type of transmission, but in most cases renders the transmission undecipherable. However, in communication configuration 300, enhanced EI-PTT device 351 and enhanced EI-PTT device 352 can be configured to electrically isolate ground signals 353 and 354 of operator communication equipment 301 within enhanced EI-PTT device 351 and/or 352 and eliminate all unintended noise during transmission This is accomplished by using EI-PTT device 351 and EI-PTT device 352 and ensuring there is not a direct current (DC) connection between radios 131 and 141 and headset 161, thereby preventing the problem of noise coupling on the microphone circuit within the closed-loop communications system. By utilizing EI-PTT device 352, transmission signal 371 sent by radio 141 via antenna 142 is a clean signal and is easily decipherable by an operator utilizing antenna 282 on radio 281 to receive the signal.

Figure 4:
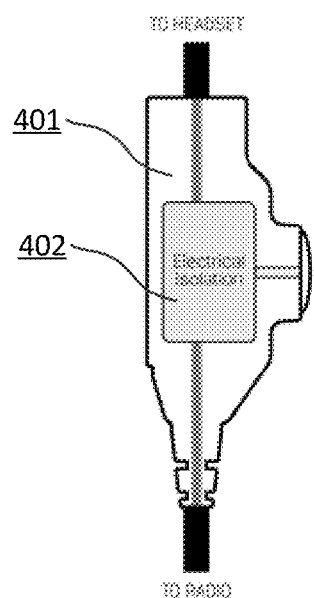
FIG. 4 illustrates some embodiments of a layout of an EI-PTT device.

FIG. 4 illustrates some embodiments of layout 400 of the EI-PTT device. As depicted in FIG. 4, layout 400 includes EI-PTT device 401 and electrical isolation circuitry 402. One side of EI-PTT device 401 connects to a radio and the other side connects to a headset. EI-PTT device 401 has one audio channel connected from the radio to the headset (i.e. speaker) and another audio channel from the headset to the radio (i.e. microphone). Inside of EI-PTT device 401, electrical isolation 402 ensures there is not a direct current (DC) connection between the radio and the headset, thereby preventing the problem of noise coupling on the microphone circuit within closed-loop communications systems.

Figure 5:
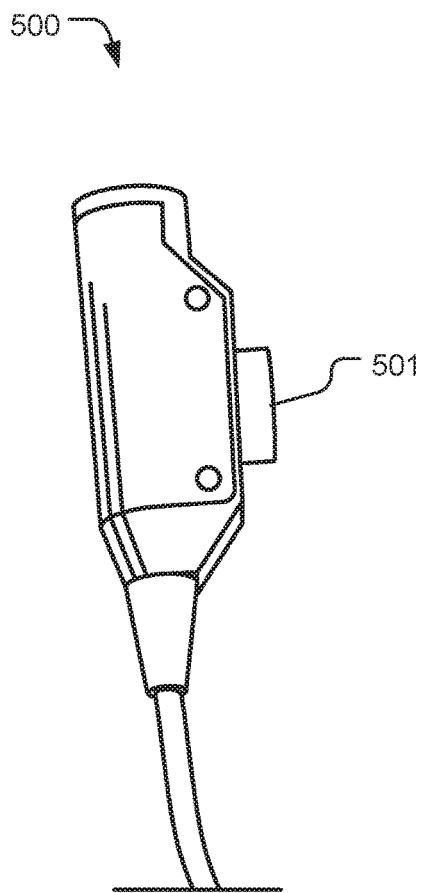
FIG. 5 illustrates other embodiments of a form-factored EI-PTT device.

FIG. 5 illustrates a form-factored prototype 500 of the Electrically-Isolated (EI) Push-To-Talk (PTT) device. The form-factored prototype 500 includes housing 501 which is similar in size and shape to traditional PTT devices. Additionally, the EI-PTT devices are similar in weight and power consumption to traditional PTT devices.

Using the EI-PTT devices help minimize or eliminate noise in a transmitted radio signal. Some conventional closed-loop communication systems with a central power supply and multiple radios can introduce noise into the closed-loop system's microphone circuit when utilizing a regular PTT device. Conventional PTT devices electrically tie the ground signals inside the PTT device. This configuration creates a noisy signal on the microphone circuit, resulting in a noisy radio transmission. But the EI-PTT devices electrically isolate the ground signals within the PTT device to reduce this problem of noise coupling. Thus, the EI-PTT devices can reduce or eliminate such noise and enhance the clarity of the transmitted radio signals.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A communication system, comprising:
   a radio including a transmitter configured to transmit radio signals and a receiver configured to receive radio signals;
   a headset configured to interface with the radio, the headset including a microphone and a speaker;
   a power supply;
   a power management controller configured to interface with the power supply and the radio, the power management controller configured to deliver power from the power supply to the radio; and
   an electrically-isolated Push-To-Talk (EI-PTT) device configured to interface with the headset and the radio and configured to enable radio transmission when activated and to enable radio reception when not activated, the EI-PTT device including a first ground circuit configured to electrically connect to the headset and a second ground circuit configured to electrically connect to the radio, wherein the first ground circuit and the second ground circuit are isolated from each other within the EI-PTT device, having no direct current (DC) connection between the first ground circuit and the second ground circuit within the EI-PTT device when both the headset and the radio are interfaced with EI-PTT device.

2. The system of claim 1, wherein the EI-PTT device is configured to electrically isolate communication ground signals on a circuit of the microphone from communication ground signals on a circuit of the radio to reduce or eliminate noise coupling between the microphone and the radio.

3. The system of claim 1, wherein isolating the first ground circuit and the second ground circuit from each other reduces or eliminates noise on radio signals transmitted from the radio.

4. The system of claim 1, wherein the EI-PTT omits any DC connection between the radio and the headset when both the radio and the headset are plugged into the EI-PTT device.

5. The system of claim 1, further comprising:
   at least one additional radio; and
   at least one additional EI-PTT device, wherein the EI-PTT device is associated uniquely with the radio, and wherein the at least one additional radio is associated uniquely with the at least one additional EI-PTT device.

6. They system of claim 1, wherein the EI-PTT device has a first audio channel from the radio to the headset and a second audio channel from the headset to the radio.

7. The system of claim 1, wherein the EI-PTT device can be remotely activated.

8. The system of claim 1, wherein the system includes two radios.

9. An Electrically-Isolated Push-To-Talk (EI-PTT) device, comprising:
   a first input-output (I/O) device including a first ground circuit configured to electrically connect to a headset containing a microphone and a speaker;
   a second I/O device including a second ground circuit configured to electrically connect to a radio;
   an actuator configured to enable radio transmission when activated and to enable radio reception when not activated; and
   electrical isolation circuitry configured to isolate the first ground circuit from the second ground circuit, thereby reducing noise transmission from the first ground circuit to the second ground circuit, wherein the electrical isolation circuitry omits any direct current (DC) connection between the first ground circuit and the second ground circuit, thereby reducing noise transmission between the radio and the headset when the radio and the headset are electrically connected to the EI-PTT device.

10. The device of claim 9, wherein the EI-PTT device is connected to a communication system that is powered via a central power source.

11. The device of claim 9, wherein the EI-PTT device has a first audio channel from the radio to the headset and a second audio channel from the headset to the radio.

12. A communication method, comprising:
    providing an Electrically-Isolated Push-To-Talk (EI-PTT) device including an input-output (I/O) device for electrical connection with a headset including a microphone and a speaker, an I/O device for electrical connection with a radio, and an activator for enabling the radio to transmit when activated and receive when not activated, the EI-PTT device further configured to isolate a first ground circuit associated with the headset from a second ground circuit associated with the radio to ensure that no direct current (DC) connection exists between the first ground circuit and the second ground circuit;
    electrically connecting the EI-PTT device to a power supply, a power management controller, the radio, and the headset;
    actuating the activator of the EI-PTT device;
    electrically isolating the first ground circuit from the second ground circuit within the EI-PTT device;
    enabling the radio to transmit; and
    transmitting a signal with little or no noise from the radio.

13. The method of claim 12, wherein isolating the first ground circuit from the second ground circuit isolates communication ground signals on a circuit of the microphone from communication ground signals on a circuit of the radio to reduce or eliminate noise coupling between the microphone and the radio.

14. The method of claim 12, wherein isolating the first ground circuit and the second ground circuit from each other reduces or eliminates noise on radio signals transmitted from the radio.

15. The method of claim 12, wherein the EI-PTT device is associated uniquely with the radio.

16. The method of claim 12, wherein the EI-PTT device has a first audio channel from the radio to the headset and a second audio channel from the headset to the radio.

17. The method of claim 12, wherein the EI-PTT device can be remotely activated.

18. The method of claim 12, wherein the EI-PTT device is connected to two radios.

19. The method of claim 12, wherein the EI-PTT device ensures there is no DC connection between the radio and the headset when the radio and the headset are plugged into the EI-PTT device.

* * * * *